United States Patent
Yang et al.

(10) Patent No.: US 11,783,477 B2
(45) Date of Patent: Oct. 10, 2023

(54) MEDICAL IMAGE PROCESS APPARATUS, MEDICAL IMAGE LEARNING METHOD, AND MEDICAL IMAGE PROCESS METHOD

(71) Applicants: THE ASAN FOUNDATION, Seoul (KR); UNIVERSITY OF ULSAN FOUNDATION FOR INDUSTRY COOPERATION, Ulsan (KR)

(72) Inventors: Dong Hyun Yang, Seoul (KR); June Goo Lee, Seoul (KR); Gaeun Lee, Daegu (KR)

(73) Assignees: THE ASAN FOUNDATION, Seoul (KR); UNIVERSITY OF ULSAN FOUNDATION FOR INDUSTRY COOPERATION, Ulsan (KR)

(*) Notice: Subject to any disclaimer, the term of this patent is extended or adjusted under 35 U.S.C. 154(b) by 130 days.

(21) Appl. No.: 17/156,947

(22) Filed: Jan. 25, 2021

(65) Prior Publication Data
US 2021/0256689 A1 Aug. 19, 2021

(30) Foreign Application Priority Data
Feb. 18, 2020 (KR) .................. 10-2020-0019820

(51) Int. Cl.
*G06T 7/00* (2017.01)
(52) U.S. Cl.
CPC .. *G06T 7/0012* (2013.01); *G06T 2207/10116* (2013.01); *G06T 2207/20081* (2013.01);
(Continued)

(58) Field of Classification Search
CPC ......... G06T 7/0012; G06T 2207/10116; G06T 2207/20081; G06T 2207/20084;
(Continued)

(56) References Cited

U.S. PATENT DOCUMENTS

2013/0156267 A1* 6/2013 Muraoka .............. A61B 6/5217
382/103
2017/0278238 A1* 9/2017 Noji ..................... A61B 6/486
(Continued)

OTHER PUBLICATIONS

Leclerc et al. "Deep Learning for Segmentation using an Open Large-Scale Dataset in 2D Echocardiography." Draft Version for IEEE TMI Journal. Aug. 22, 2019. pp. 1-33.
(Continued)

*Primary Examiner* — Van D Huynh
(74) *Attorney, Agent, or Firm* — Maier & Maier, PLLC

(57) ABSTRACT

A medical image learning method of a medical image process apparatus includes preparing a plurality of body X-ray images for learning as an input of a learning data set, preparing internal diagnostic indicator information corresponding to each of the plurality of body X-ray images for learning as a label of the learning data set, and learning an artificial neural network model using the learning data set. The internal diagnostic indicator information includes information on a cardiovascular border. The information on the cardiovascular border includes information on at least one of an aortic knob, a pulmonary conus, a left atrial appendage, an upper right cardiac border, a lower right cardiac border, a lower left cardiac border, a descending aorta, a carina, an upper end point of a diaphragm, a right pulmonary artery, a posterior cardiac border, and an anterior spinal border.

10 Claims, 6 Drawing Sheets

(52) U.S. Cl.
CPC ............... *G06T 2207/20084* (2013.01); *G06T 2207/30048* (2013.01)

(58) Field of Classification Search
CPC . G06T 2207/30048; G06T 2207/10081; G06T 2207/10088; G06T 2207/10132; G06N 3/0454; G06N 3/08; G16H 30/40; G16H 50/20
USPC ......................................................... 382/157
See application file for complete search history.

(56) References Cited

U.S. PATENT DOCUMENTS

| | | | |
|---|---|---|---|
| 2017/0360392 A1* | 12/2017 | Kaneko | A61B 6/463 |
| 2018/0325481 A1* | 11/2018 | Young | A61B 6/5217 |
| 2019/0156204 A1* | 5/2019 | Bresch | G06N 3/08 |
| 2019/0340753 A1* | 11/2019 | Brestel | G16H 15/00 |
| 2019/0340763 A1* | 11/2019 | Laserson | G06F 18/2321 |
| 2020/0349706 A1* | 11/2020 | Gao | G06T 7/0014 |
| 2020/0367974 A1* | 11/2020 | Khalid | A61B 34/20 |
| 2020/0380692 A1* | 12/2020 | Zhang | G06T 7/0004 |
| 2021/0073977 A1* | 3/2021 | Carter | G06T 11/20 |
| 2021/0150710 A1* | 5/2021 | Hosseinzadeh Taher | G06V 10/764 |
| 2021/0212648 A1* | 7/2021 | Bailey, Sr. | G16H 30/20 |

OTHER PUBLICATIONS

Mulay et al. "Liver Segmentation from Multimodal Images using HED-Mask R-CNN." Multiscale Multimodal Medical Imaging. MMMI 2019. Lecture Notes in Computer Science, vol. 11977. Oct. 23, 2019. pp. 1-8.

* cited by examiner

MEDICAL IMAGE PROCESS APPARATUS, MEDICAL IMAGE LEARNING METHOD, AND MEDICAL IMAGE PROCESS METHOD

CROSS-REFERENCE TO RELATED APPLICATIONS

This application is based on and claims priority from Korean Patent Application No. 10-2020-0019820 filed on Feb. 18, 2020, the disclosures of which are incorporated herein in its entirety by reference for all purposes.

TECHNICAL FIELD

The present disclosure relates to a method and an apparatus for learning a medical image of a body, and a method and an apparatus for processing a medical image of a body.

BACKGROUND

A medical image apparatus is an apparatus used to obtain an image of an internal structure of an object to be diagnosed. The medical image apparatus is a non-invasive examination apparatus which photographs and processes structural details in a body, internal tissues of the body, and flow of body fluids to show them to a user. The user, such as a doctor, may diagnose a health condition and a disease of a patient by using a medical image output from the medical image apparatus.

Examples of the medical image apparatus include, e.g., an X-ray imaging device for imaging an image by irradiating an object with X-rays and detecting X-rays passing through the object, a magnetic resonance imaging (MRI) apparatus for providing a magnetic resonance image, a computed tomography (CT) apparatus, and an ultrasound diagnostic apparatus.

In recent years, due to development of image processing technology such as machine learning, the medical imaging apparatus may analyze the acquired medical image to detect an abnormal region or generate an analysis result for the abnormal region, which is a site where an abnormality occurs in the object. As described above, an image regenerated by analyzing the acquired medical image is referred to as a reading auxiliary image. When the reading auxiliary image is provided to the doctor, the doctor can more easily diagnose whether an abnormality has occurred in the object by referring to the reading auxiliary image.

Meanwhile, a chest X-ray image is used to detect and diagnose various lung diseases, and a doctor can obtain an internal diagnostic indicator such as a cardiovascular border from a chest X-ray image of an object to be diagnosed and detect or diagnose a lung disease based on the obtained internal diagnostic indicator.

However, a highly skilled doctor can only obtain the internal diagnostic indicator such as the cardiovascular border from the chest X-ray image accurately, and thus, there occurs a problem that the accuracy of the internal diagnostic indicator obtained from the chest X-ray image changes according to a skill level of a doctor.

SUMMARY

In view of above, the present disclosure provides a medical image learning method and a medical image process apparatus for learning an artificial neural network model using body X-ray images and internal diagnostic indicator information.

In addition, a medical image learning method and a medical image process apparatus are provided in which the learned artificial neural network model obtains internal diagnostic indicator information from the body X-ray image of an object to be diagnosed.

The problem to be solved of the present disclosure is not limited to those mentioned above, and other problems to be solved which are not mentioned will be clearly understood by those of ordinary skill in the art from the following description.

In accordance with a first aspect of the present disclosure, there is provided a medical image learning method of a medical image process apparatus, including: preparing a plurality of body X-ray images for learning, as an input of a learning data set; preparing internal diagnostic indicator information corresponding to each of the plurality of body X-ray images for learning, as a label of the learning data set; and learning an artificial neural network model using the learning data set.

In accordance with a second aspect of the present disclosure, there is provided a computer-readable recording medium for storing a computer program, wherein the computer program is executed by a processor and includes a command for causing the processor to perform the method described above.

In accordance with a third aspect of the present disclosure, there is provided a medical image process method using a medical image process apparatus, including: causing an artificial neural network model which has learned medical images to receive a body X-ray image of an object to be diagnosed; and outputting internal diagnostic indicator information obtained through the artificial neural network model based on the body X-ray image of the object to be diagnosed.

In accordance with a fourth aspect of the present disclosure, there is provided a computer-readable recording medium for storing a computer program, wherein the computer program is executed by a processor and includes a command for causing the processor to perform the method described above.

In accordance with a fifth aspect of the present disclosure, there is provided a medical image process apparatus including: an input unit configured to receive a learning data set whose input is body X-ray images for learning and label is internal diagnostic indicator information corresponding to each of the body X-ray images for learning; and an artificial neural network model unit in which an artificial neural network model learns the learning data set received through the input unit.

In accordance with a sixth aspect of the present disclosure, there is provided a medical image process apparatus including: an input unit configured to receive a body X-ray image of the body of an object to be diagnosed; an artificial neural network model unit in which an artificial neural network model obtains internal diagnostic indicator information of the object to be diagnosed from the body X-ray image of the object to be diagnosed received through the input unit; and an output unit configured to output the internal diagnostic indicator information of the object to be diagnosed obtained from the artificial neural network model unit.

According to an embodiment, an artificial neural network model is learned so that the learned artificial neural network model can accurately acquire internal diagnostic indicator information, such as a cardiovascular border, from an X-ray image of a body of a person to be diagnosed.

Accordingly, accurate internal diagnostic indicator information of the object to be diagnosed can be output. Further, the internal diagnostic indicator information can be displayed on the body X-ray image of the object to be diagnosed. Further, numerical values based on the internal diagnostic indicator information of the object to be diagnosed can be output. In addition, it is possible to output the result of comparing the reference value for the internal diagnostic indicator information obtained through learning and the internal diagnostic indicator information of the object to be diagnosed.

DETAILED DESCRIPTION OF THE EMBODIMENTS

Figure 1:
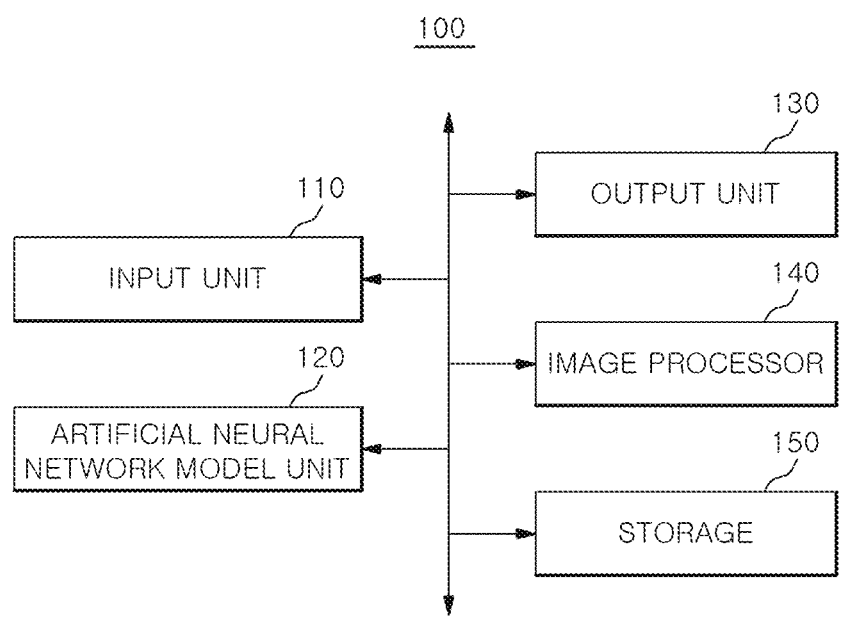
FIG. 1 is a block diagram of a medical image process apparatus according to an embodiment.

Advantages and features of the present disclosure, and a method of achieving them will become apparent with reference to an embodiment described later together with the accompanying drawings. However, the present disclosure is not limited to an embodiment disclosed below, but may be implemented in a variety of different forms. That is, the embodiment is provided to ensure that descriptions of the present disclosure are complete and to fully inform a scope of the invention to a person with ordinary knowledge in a technical field to which the present disclosure belongs, and the invention is only defined by the scope of claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components such as software components, object-oriented software components, class components, and task components, processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

In the present disclosure, an object to be diagnosed or a patient may include a human or an animal, or a part of a human or animal.

In addition, in the present specification, an "image" may mean multi-dimensional data composed of discrete image elements (for example, pixels in a 2D image and pixels in a 3D image).

FIG. 1 illustrates a configuration of a medical image process apparatus 100 according to an embodiment, but the configuration illustrated in FIG. 1 is only exemplary. The medical image process apparatus 100 may be implemented in or include a PC or a server.

Referring to FIG. 1, the medical image process apparatus 100 includes an input unit 110 and an artificial neural network model unit 120, and according to an embodiment, may further include an output unit 130, an information processor 140, or a storage unit 150.

The input unit 110 receives a learning data set for learning an artificial neural network model of the artificial neural network model unit 120. In addition, the input unit 110 receives a body X-ray image of the object to be diagnosed for input to the learned artificial neural network model. For example, the input unit 110 may receive the body X-ray images for learning as the learning data set. Further, the input unit 110 may receive internal diagnostic indicator information of an individual body corresponding to each of the body X-ray images for learning as a label in the learning data set. For example, the internal diagnostic indicator information may include information on a cardiovascular border. For example, the information on the cardiovascular border may include an aortic knob, a pulmonary conus (PC), a left atrial appendage (LAA), a right upper cardiac border (CB), a right lower cardiac border, a left lower cardiac border, a descending aorta (DAO), a carina, a diaphragm upper point, a right pulmonary artery, a heart posterior edge, a spine anterior border, or the like.

The artificial neural network model unit 120 includes the artificial neural network model which learns the learning data set received through the input unit 110. In the learning data set to be learned by the artificial neural network model, an input may be body X-ray images for learning, and labels may be internal diagnostic indicator information of individual bodies which respectively correspond to the body X-ray images for learning. In addition, the learned artificial neural network model of the artificial neural network model unit 120 may obtain the internal diagnostic indicator information of the object to be diagnosed from the body X-ray image of the object to be diagnosed received from the input unit 110. For example, the artificial neural network model may be a Mask R-CNN model. The Mask R-CNN model can use the body X-ray images for learning as learning images for the Mask R-CNN model, and can use the internal diagnostic indicator information of each body corresponding to each of the body X-ray images for learning as a mask of the Mask R-CNN model. For example, when the label of the learning data set received through the input unit 110 includes information on the cardiovascular boundary as the internal diagnostic indicator information of individual bodies corresponding to the body X-ray images for learning, the learned artificial neural network model of the artificial neural network model unit 120 includes, as the internal diagnostic indicator information of the object to be diagnosed, information on at least one of a thoracic length (TL), a distance between a right axis and a left axis of a heart, a cardiothoracic ratio (CTR), a curvature and a length of an aortic knob, a curvature and a length of a pulmonary conus, a curvature and a length of a left atrial appendage, a curvature and a length of an upper right heart border, a curvature and a length of a lower right heart border, a curvature and a length of a lower left heart border, a curvature and a length of a descending aorta, an angle of a carina, a cardiac area, a relative position between a diaphragm and a rib, an average distance of a right pulmonary artery, and an average diameter of a heart-to-spine.

In addition, the artificial neural network model unit 120 may obtain a reference value for the internal diagnostic indicator information of the body X-ray images for learning according to a learning result using the learning data set, and may derive a result obtained by comparing the obtained reference value with the internal diagnostic indicator information of the object to be diagnosed. For example, the artificial neural network model unit 120 may include a memory storing a command programmed to perform a function as the artificial neural network model and a microprocessor which executes the command.

The output unit 130 may externally output diagnostic indicator information of the object to be diagnosed obtained by the artificial neural network model unit 120. For example, the output unit 130 may output in a form of marking the internal diagnostic indicator information on the body X-ray image of the object to be diagnosed, or in a form of location information (for example, location coordinates) on the body X-ray image for the internal diagnostic indicator information of the object to be diagnosed. In addition, the output unit 130 may externally output a result obtained by comparing the reference value for the internal diagnostic indicator information of the body X-ray images for learning derived by the artificial neural network model unit 120 with the internal diagnostic indicator information of the object to be diagnosed. In addition, when the information obtained by the artificial neural network model unit 120 is processed and provided in a predetermined form by the information processor 140, the output unit 130 may output the processed information so that the processed information can be recognized from the outside. The output unit 130 may include a port which outputs internal diagnostic indicator information, a wired communication module, a wireless communication module, or the like. Alternatively, the output unit 130 may include an image display capable of outputting the internal diagnostic indicator information of the object to be diagnosed in the form of an image.

The information processor 140 may process various types of information obtained by the artificial neural network model unit 120 into a predetermined form and provide the processed information to the output unit 130. For example, the information processor 140 may process the body X-ray image of the object to be diagnosed input through the input unit 110 in the form of marking the internal diagnostic indicator information of the object to be diagnosed and provide the marked body X-ray image to the output unit 130. Alternatively, the information processor 140 may provide a numerical value based on the internal diagnostic indicator information of the object to be diagnosed obtained by the artificial neural network model unit 120 to the output unit 130. Alternatively, the information processor 140 may process a result obtained by comparing the reference value with respect to the internal diagnostic indicator information on the body X-ray images for learning derived by the artificial neural network model unit 120 with the internal diagnostic indicator information of the object to be diagnosed in a predetermined form, and provide the processed result to the output unit 130. For example, the information processor 140 may include a memory storing a command programmed to perform a function of processing various types of information into a predetermined form, and a microprocessor which executes the command.

The storage unit 150 may store the command programmed to allow the medical image process apparatus 100 to perform various functions, store various types of information such as the image received through the input unit 110, or store a result of calculation and processing executed by the artificial neural network model unit 120 and/or the information processor 140. For example, the storage unit 150 may be a magnetic media such as a hard disk, a floppy disk, and a magnetic tape, an optical media such as a CD-ROM and a DVD, a magneto-optical media such as a floptical disk, or a computer-readable recording medium such as a hardware device specially configured to store and execute program commands such as a flash memory.

Figure 2:
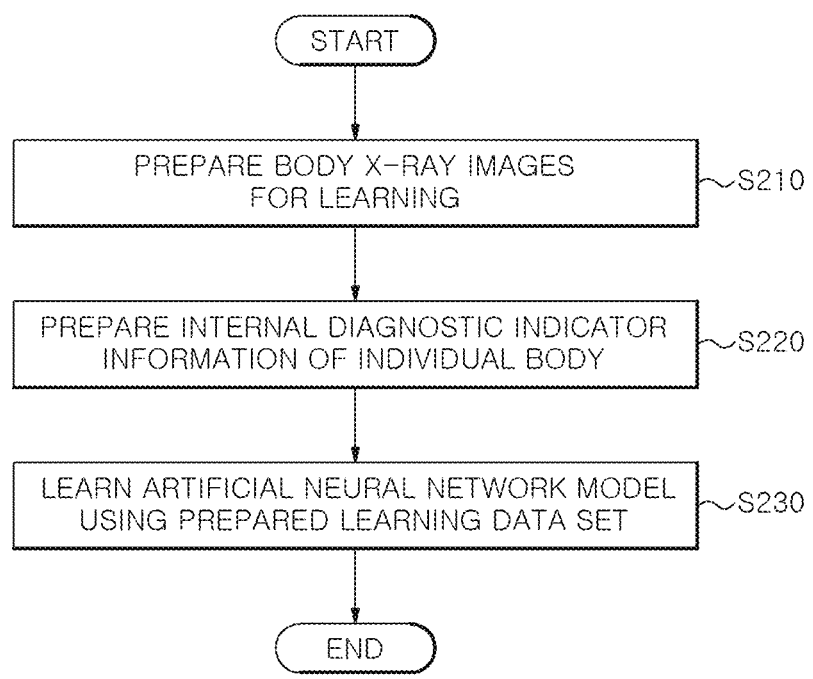
FIG. 2 is a flowchart illustrating a medical image learning method of the medical image process apparatus according to the embodiment.
Figure 3:
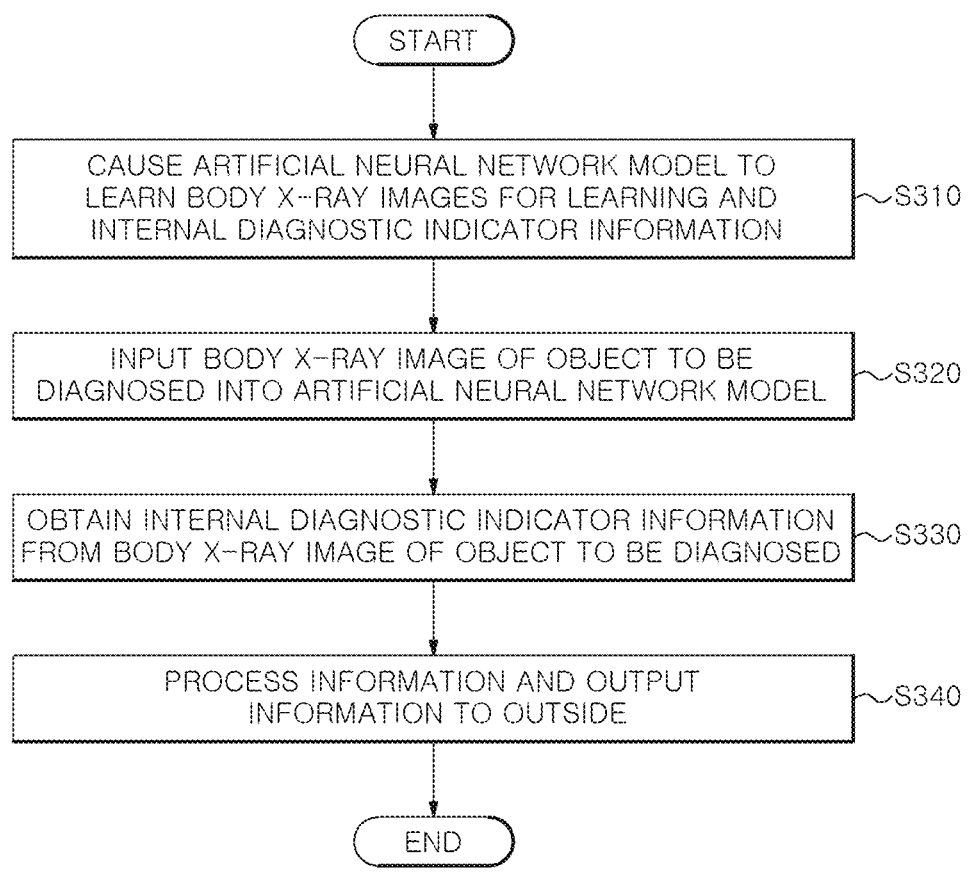
FIG. 3 is a flowchart illustrating a medical image process method of the medical image process apparatus according to the embodiment.
Figure 4:
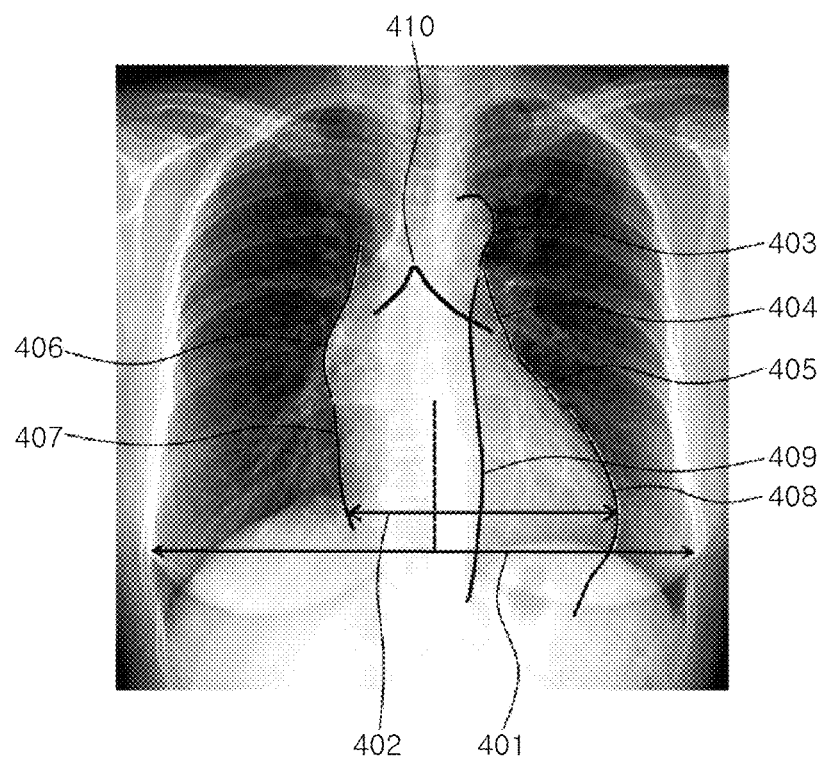
FIG. 4 is a chest X-ray image illustrating internal diagnostic indicator information which can be obtained from a body X-ray image by the medical image process apparatus according to the embodiment.
Figure 5:
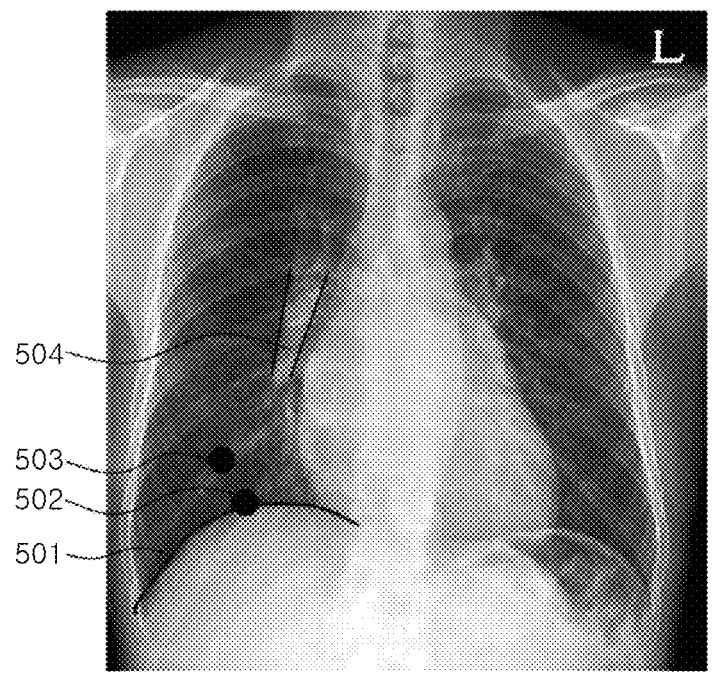
FIG. 5 is a chest X-ray image illustrating internal diagnostic indicator information which can be obtained from a body X-ray image by the medical image process apparatus according to the embodiment.
Figure 6:
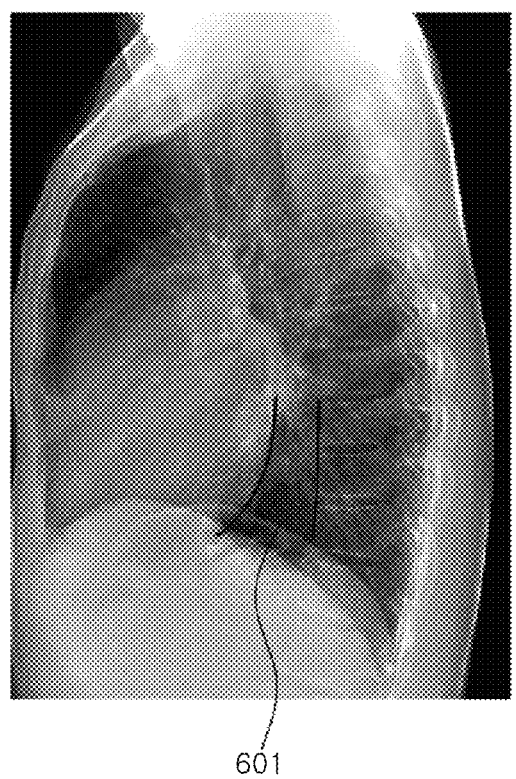
FIG. 6 is a chest X-ray image illustrating internal diagnostic indicator information which can be obtained from a body X-ray image by the medical image process apparatus according to the embodiment.

FIG. 2 is a flowchart illustrating the medical image learning method of the medical image process apparatus 100 according to the embodiment, and FIG. 3 is a flowchart illustrating the medical image process method of the medical image process apparatus 100 according to the embodiment. Moreover, FIGS. 4 to 6 are chest X-ray images illustrating the internal diagnostic indicator information which can be obtained from the body X-ray image by the medical image process apparatus 100 according to the embodiment.

Hereinafter, the medical image learning method and the medical image process method of the medical image process apparatus 100 according to the embodiment of the present disclosure will be described in detail with reference to FIGS. 1 to 6.

First, the medical image learning method of the medical image process apparatus 100 will be described according to a flow sequence of FIG. 2.

The learning data set for learning the artificial neural network model of the artificial neural network model unit 120 of the medical image process apparatus 100 is prepared. For example, the body X-ray images for learning may be prepared as the input of the learning data set (step S210), and internal diagnostic indicator information of an individual body corresponding to each of the body X-ray images for learning may be prepared as the label of the learning data set (step S220).

According to the embodiment, the medical image process apparatus 100 may use information on a cardiovascular border as illustrated in FIGS. 4 to 6 for the internal diagnostic indicator information. The cardiovascular borders corresponding to the reference numerals in FIGS. 4 to 6 are as follows.

403: aortic knob
404: pulmonary conus
405: left atrial appendage
406: upper right heart border
407: lower right heart border
408: lower left heart border
409: descending aorta
410: carina
502: upper end point of diaphragm 501
504: right pulmonary artery
601: heart-to-spine Based on the information on the cardiovascular border of the reference numerals 401 to 601, the medical image process apparatus 100 can use, as the internal diagnostic indicator information, a thoracic length 401, a distance 402 between a right axis and a left axis of a heart, a cardiothoracic ratio, a curvature and a length of the aortic knob 403, a curvature and a length of the pulmonary conus 404, a curvature and a length of the left atrial appendage 404, a curvature and a length of the upper right heart border 406, a curvature and a length of the lower right heart border 407, a curvature and a length of the lower left heart border 408, a curvature and a length of the descending aorta 409, an angle of a carina 410, a cardiac area, a relative position between the diaphragm 501 and a rib 503, an average distance of the right pulmonary artery 504, an average diameter of a heart-to-spine 601, or the like. Here, the relative position of the diaphragm 501 and the rib 503 may be used for determining whether the object to be diagnosed has sufficiently breathed when taking an X-ray image. For example, when the upper point of the diaphragm is located below the 10th rib, it can be determined that the object to be diagnosed has sufficiently breathed. The X-ray images taken while not breathing sufficiently may be excluded so that the X-ray images are not reflected in the internal diagnostic indicator information.

The learning data set prepared through the steps S210 and S220 is input through the input unit 110 and provided to the artificial neural network model unit 120, and the artificial neural network model of the artificial neural network model unit 120 learns the learning data set in the steps S210 and S220. For example, the Mask R-CNN model can be used as the artificial neural network model. In this case, the body X-ray images for learning are used as training images of the Mask R-CNN model, and the internal diagnostic indicator information of each individual body corresponding to each of the body X-ray images for learning may be used as the mask of the Mask R-CNN model (step S230).

Next, the medical image process method of the medical image process apparatus 100 will be described according to the flow sequence of FIG. 3.

First, as described with reference to FIG. 3, in the medical image process apparatus 100, the artificial neural network model of the artificial neural network model unit 120 learns the learning data set including the body X-ray images for learning as the input data and the internal diagnostic indicator information of each of individual bodies corresponding to each of the body X-ray images for learning as the label (step S310).

In a state in which the artificial neural network model of the artificial neural network model unit 120 is learned in this way, the X-ray image of the body of the object to be diagnosed is input through the input unit 110 and provided to the artificial neural network model unit 120 (step S320).

In addition, the artificial neural network model of the artificial neural network model unit 120 obtains internal diagnostic indicator information of the object to be diagnosed from the internal X-ray image of the object to be diagnosed provided through the step S320. Here, the in-body diagnostic indicator information obtained by the artificial neural network model may include the thoracic length 401, the distance 402 between a right axis and a left axis of a heart, the cardiothoracic ratio, the curvature and length of the aortic knob 403, the curvature and length of the pulmonary conus 404, the curvature and length of the left atrial appendage 404, the curvature and length of the upper right heart border 406, the curvature and length of the lower right heart border 407, the curvature and length of the lower left heart border 408, the curvature and length of the descending aorta 409, the angle of the carina 410, the cardiac area, the relative position between the diaphragm 501 and the rib 503, the average distance of the right pulmonary artery 504, the average diameter of the heart-to-spine 601, or the like (step S330).

Then, the output unit 130 may externally output internal diagnostic indicator information of the object to be diagnosed obtained by the artificial neural network model unit 120.

Here, the output unit 130 may output the internal diagnostic indicator information obtained by the artificial neural network model unit 120 in the form of raw data, but may also output the information in a predetermined form processed by the information processor 140. To this end, the information processor 140 may process various types of information obtained by the artificial neural network model unit 120 into a predetermined form and provide the processed information to the output unit 130. For example, the information processor 140 may process the body X-ray image of the object to be diagnosed input through the input unit 110 in the form of marking the internal diagnostic indicator information of the object to be diagnosed and provide the information to the output unit 130. Alternatively, the information processor 140 may provide a numerical value based on the internal diagnostic indicator information of the object to be diagnosed obtained by the artificial neural network model unit 120 to the output unit 130. Alternatively, the information processor 140 may process a result obtained by comparing the reference values of the body X-ray images for learning derived by the artificial neural network model unit 120 with respect to the internal diagnostic indicator information with the internal diagnostic indicator information of the object to be diagnosed, in a predetermined form, and may provide the processed result to the output unit 130. For example, information such as what percentage (%) is different from a reference value obtained through pre-learning of the body X-ray image of the object to be diagnosed input through the step S320 may be provided.

Accordingly, the output unit 130 may output in the form of marking the internal diagnostic indicator information on the body X-ray image of the object to be diagnosed, or in the form of location information (for example, location coordinates) on the body X-ray image for the internal diagnostic indicator information of the object to be diagnosed. In addition, the output unit 130 may externally output the result obtained by comparing the reference value for the internal diagnostic indicator information of the body X-ray images for learning derived by the artificial neural network model unit 120 with the internal diagnostic indicator information of the object to be diagnosed. For example, the output unit 130 may output information obtained by the artificial neural network model unit 120 so that the information can be recognized from the outside (step S340).

Meanwhile, each step included in the medical image learning method and the medical image process method according to the above-described embodiment may be implemented in a computer-readable recording medium recording a computer program programmed to execute the step.

In addition, each step included in the medical image learning method and the medical image process method according to the above-described embodiment may be implemented in the form of a computer program stored in a computer-readable recording medium programmed to perform the steps.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable recording medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A medical image learning method of a medical image process apparatus including at least one processor and one memory, comprising:
    preparing a plurality of body X-ray images for learning as an input of a learning data set;
    preparing internal diagnostic indicator information corresponding to each of the plurality of body X-ray images for learning as a label of the learning data set; and
    learning an artificial neural network model using the learning data set,
    wherein the internal diagnostic indicator information includes a relative position of a diaphragm and a rib, and
    wherein, among the plurality of body X-ray images for learning, X-ray images in which an upper point of the diaphragm is located above the 10th rib is excluded from the learning data set before learning the artificial neural network model.

2. The method of claim 1, wherein the internal diagnostic indicator information includes information on a cardiovascular border.

3. The method of claim 2, wherein the information on the cardiovascular border includes information on at least one of an aortic knob, a pulmonary conus, a left atrial appendage, an upper right cardiac border, a lower right cardiac border, a lower left cardiac border, a descending aorta, a carina, an upper end point of a diaphragm, a right pulmonary artery, a posterior cardiac border, and an anterior spinal border.

4. The method of claim 1, wherein the artificial neural network model is a Mask R-CNN model, the plurality of body X-ray images for learning are used as training images for the Mask R-CNN model, and the internal diagnostic indicator information is used as a mask for the Mask R-CNN model.

5. A medical image process method using a medical image process apparatus including at least one processor and one memory, comprising:
    causing an artificial neural network model which has learned medical images to receive a body X-ray image of an object to be diagnosed; and
    outputting internal diagnostic indicator information obtained through the artificial neural network model based on the body X-ray image of the object to be diagnosed,
    wherein the internal diagnostic indicator information includes information on a cardiovascular border, and
    wherein the internal diagnostic indicator information includes a distance between a right axis and a left axis of a heart, a cardiothoracic ratio, a curvature and a length of an aortic knob, a curvature and a length of a pulmonary conus, a curvature and a length of a left atrial appendage, a curvature and a length of an upper right heart border, a curvature and a length of a lower right heart border, a curvature and a length of a lower left heart border, a curvature and a length of a descending aorta, an angle of a carina, a cardiac area, an average distance of a right pulmonary artery, and an average diameter of a heart-to-spine.

6. The medical image process method of claim 5, further comprising:
    learning the artificial neural network model using a learning data set whose input is body X-ray images for learning and whose label is information on internal diagnostic indicators corresponding to each of the body X-ray images for learning.

7. The medical image process method of claim 5, wherein the outputting of the internal diagnostic indicator information includes displaying and outputting the internal diagnostic indicator information of the object to be diagnosed on the body X-ray image of the object to be diagnosed.

8. The medical image process method of claim 5, wherein the outputting of the internal diagnostic indicator information includes outputting a numerical value based on the internal diagnostic indicator information of the object to be diagnosed.

9. The medical image process method of claim 6, wherein the outputting of the internal diagnostic indicator information includes outputting a result obtained by comparing the internal diagnostic indicator information of the object to be diagnosed with a reference value for the internal diagnostic indicator information of the body X-ray images for learning obtained from a learning result of the artificial neural network model.

10. A medical image process apparatus including at least one processor and one memory, comprising:

an input unit configured to receive a learning data set whose input is body X-ray images for learning and label is internal diagnostic indicator information corresponding to each of the body X-ray images for learning; and an artificial neural network model unit in which an artificial neural network model learns the learning data set received through the input unit, wherein the internal diagnostic indicator information includes a relative position of a diaphragm and a rib, and wherein, among the plurality of body X-ray images for learning, X-ray images in which an upper point of the diaphragm is located above the 10th rib is excluded from the learning data set before learning the artificial neural network model.

* * * * *